(12) United States Patent
Mango (10) Patent No.: US 6,283,412 B1
(45) Date of Patent: Sep. 4, 2001

(54) ANTI-SLOSH LIQUID PROPELLANT TANK FOR LAUNCH VEHICLES

(75) Inventor: Frank Mango, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/430,556

(22) Filed: Oct. 29, 1999

Related U.S. Application Data (63) Continuation of application No. 09/287,614, filed on Apr. 7, 1999, now abandoned.
(60) Provisional application No. 60/081,082, filed on Apr. 8, 1998.

(51) Int. Cl.⁷ ........................................................ B64G 1/22
(52) U.S. Cl. .................................. 244/135 R; 244/158 R; 220/563
(58) Field of Search ............................ 244/158 R, 135 R; 220/563, 560.11, 560.13, 565; 405/29

(56) References Cited

U.S. PATENT DOCUMENTS

| | | | |
|---|---|---|---|
| 3,015,461 | * 1/1962 | Fineblum | 244/135 R |
| 3,131,789 | 5/1964 | Watter . | |
| 3,321,159 | * 5/1967 | Jackson | 244/135 R |
| 3,508,578 | 4/1970 | Stephens et al. . | |
| 3,854,905 | 12/1974 | Balzer et al. | 55/159 |
| 3,979,005 | * 9/1976 | Robinson et al. | 244/135 R |
| 4,050,608 | * 9/1977 | Smith | 220/563 |
| 4,168,718 | 9/1979 | Hess et al. | 137/177 |
| 4,172,680 | * 10/1979 | Brown | 405/29 |
| 4,272,257 | 6/1981 | Ellion et al. | 55/38 |
| 4,399,831 | 8/1983 | Robert | 137/154 |
| 4,489,745 | 12/1984 | Netter et al. | 137/209 |
| 4,553,565 | 11/1985 | Kerebel | 137/590 |
| 4,589,526 | * 5/1986 | Chang et al. | 220/563 |
| 4,676,463 | 6/1987 | Tansill | 244/129.2 |
| 4,715,399 | 12/1987 | Jaekle, Jr. et al. | 137/209 |
| 4,733,531 | 3/1988 | Grove | 60/259 |
| 4,743,278 | 5/1988 | Yeh | 55/159 |
| 4,844,278 | * 7/1989 | Freiwald et al. | 220/563 |
| 4,880,185 | 11/1989 | Apfel | 244/135 B |
| 4,901,762 | 2/1990 | Miller, Jr. et al. | 137/574 |
| 4,976,398 | 12/1990 | Bruhn | 244/135 R |
| 5,042,751 | 8/1991 | Kolom | 244/135 R |
| 5,263,329 | 11/1993 | Grove et al. | 62/50.1 |
| 5,279,323 | 1/1994 | Grove et al. | 137/154 |
| 5,293,895 | 3/1994 | Grove et al. | 137/154 |

FOREIGN PATENT DOCUMENTS

| | | | |
|---|---|---|---|
| 2 234 189 | 1/1975 | (FR) | B64D/37/06 |
| 2 109 760 A | 10/1982 | (GB) | B64G/1/40 |
| 2 170 163 A | 10/1985 | (GB) | B64D/37/02 |
| 6-56097 | 3/1994 | (JP) | B64G/1/40 |

* cited by examiner

*Primary Examiner*—Galen L. Barefoot
(74) *Attorney, Agent, or Firm*—Marsh Fischmann & Breyfogle LLP (57) ABSTRACT

A low profile slosh attenuation system is disclosed for liquid propellant tanks of a launch vehicle (100). The slosh attenuation system provides a desired level of slosh damping while reducing or eliminating the need for conventional high profile slosh barrier rings. In one embodiment, the slosh attenuation system is integrated into structural grids (300) used to construct a propellant tank. The invention results in substantial reduction in tank mass, construction complexity and cost.

20 Claims, 7 Drawing Sheets

ANTI-SLOSH LIQUID PROPELLANT TANK FOR LAUNCH VEHICLES

CROSS-REFERENCE TO RELATED APPLICATIONS

This application claims priority under 35 U.S.C. §119(e) from provisional patent application No. 60/081,082 entitled "IMPROVED FUEL TANK AND METHOD FOR ATTENUATING SLOSH IN FUEL TANKS" filed on Apr. 8, 1998. This applicaton is a continuation of U.S. Ser. No. 09/287,614 filed Apr. 7, 1999 now abandoned.

FIELD OF THE INVENTION

The present invention relates generally to propellant tanks for launch vehicles and, in particular, to a liquid propellant tank for providing a desired level of slosh attenuation with reduced mass and complexity of construction.

BACKGROUND OF THE INVENTION

Launch vehicles are generally used to launch payloads, such as satellites or scientific equipment, from the Earth's surface into space. Once in space, other on-board spacecraft propulsion systems may be utilized for orbital adjustments or transfers and attitude control. It will thus be appreciated that unlike such other on-board spacecraft propulsion systems and associated propellant tanks, launch vehicle propulsion systems and propellant tanks operate within the atmosphere and are not limited to operation in a low or zero g environment. Indeed, launch vehicles often experience a high g environment as a result of the substantial thrusts generated by the launch vehicle. As a result, launch vehicles are subject to substantial jostling due to wind and movement of thrust deflectors or the like during maneuvering.

Liquid propellant engines are used for many launch vehicle applications. Such liquid propellant engines have a number of desirable qualities including the ability to turn the engines off, as may be desired, after ignition. Accordingly, many launch vehicles include liquid propellant tanks for containing one or more liquid propellants. Among the important liquid rocket engine propellants are $RP_1$ and $LO_2$.

Although liquid propellant engines are advantageous for many applications, they also entail certain potential complications for launch vehicles. One of these complications relates to propellant sloshing. As noted above, launch vehicles may be subject to substantial jostling while traversing the atmosphere. As a result of this jostling, lateral forces are exerted on the liquid propellant tending to cause sloshing, i.e., non-uniform fluid flow along a longitudinal extent of the propellant tank wall and associated non-uniform distribution of the propellant across width of the tank.

Such sloshing is not a trivial concern. For example, for one proposed launch vehicle design, the portion of the total weight of the liquid propellant which sloshes will be about 24,725 pounds in the case of $LO_2$ and 17,425 pounds for $RP_1$. The sloshing motion of this propellant can induce significant structural loads and rigid body disturbances in the vehicle as well as potentially affecting control system operation. The potential for excitations of the sloshing resonances and their interaction with the vehicle control system are primarily driven by the location of the sloshing masses relative to the vehicle center of gravity and center of percussion, the modal frequencies and lateral modal deflections in the vicinity of the sloshing mass and the damping of the sloshing resonances. Most of these parameters cannot easily be changed should propellant sloshing dynamics become a critical issue. One exception is the propellant slosh damping.

Conventional approaches to slosh damping have generally involved installing ring baffles within the propellant tank to attenuate sloshing. Specifically, the propellant tank generally includes a cylindrical propellant containment area defined by a side wall. In some cases, the inner side wall is formed from an isogrid structure including a number of intersecting, raised ribs defining a network of cells. These isogrid structures provide a desirable combination of lightweight construction, load bearing strength and rigidity. A number of baffle rings are installed within these side walls to attenuate sloshing. Generally, these baffle rings are annular in shape and extend inwardly from the side wall, for example, six to twelve inches or more in the case of tanks having a diameter of about 12 feet. These baffles may be spaced at a longitudinal distance of, for example, two to four feet, throughout a tank slosh zone, e.g., throughout the entire propellant containment area or a portion thereof where slosh is of concern.

It will be appreciated that such baffling may involve substantial mass/weight. In one case, the dry weight of such baffles was projected to be about 350–400 pounds for a launch vehicle booster. This weight, of course, affects the total thrust requirements and/or available payload. Moreover, the fabrication and installation of these baffles increases construction complexity and overall costs.

SUMMARY OF THE INVENTION

The present invention is directed to a method and apparatus for attenuating slosh in liquid fuel tanks of a launch vehicle without undue mass and additional structure dedicated to slosh control. It has been recognized that, for a variety of launch vehicle applications, the desired level of slosh attenuation or damping can be achieved through either a smaller number of larger ring baffles spaced at greater longitudinal distances across a slosh zone or a larger number of smaller ring baffles spaced at smaller longitudinal distances across the slosh zone. The present invention is based in part on the recognition that, in certain cases, a desired level of slosh control can be obtained using a slosh attenuation system that is substantially contained within a space adjacent to the tank wall that is significantly narrower than that of ring baffles that have previously been employed. In one particularly advantageous application, the slosh attenuation system can be integrated into an appropriate structural grid such that structure dedicated exclusively to slosh attenuation can be substantially reduced or eliminated. The present invention thus allows for achievement of a level of slosh attenuation as desired for certain launch vehicle liquid propellent tank applications while reducing mass, simplifying construction and reducing costs.

In accordance with one aspect of the present invention, a liquid propellant tank for a launch vehicle includes a low profile slosh attenuation system. The propellant tank has a containment area for containing a liquid propellant such as, for example, $LO_2$ or $RP_1$. The containment area has a longitudinal axis and a width and, in operation, the propellant tank is generally oriented such that the longitudinal axis is aligned with the flight path of the launch vehicle. It will thus be appreciated that lateral forces experienced by the launch vehicle tend to induce slosh defined by a nonuniform distribution of the liquid propellant relative to the width of the containment area; that is, side-to-side displacement of the propellant with attendant sloshing along the inside wall of the containment area The containment area further includes a slosh zone defined relative to the range of locations of the surface of the liquid propellant as the propellant is expended during a launch operation. In this regard, the propellant in the tank can be modeled as being divided into two distinct segments. The first is designated the "rigid" propellant and, for purposes of analyzing the effects of slosh, can be treated as part of the vehicle dry structure which moves with the vehicle rigid body translational/protational modes. The rest of the propellant located at the top of the tank is designated the "sloshing" propellant and is assumed to move laterally with respect to the tank at a specified frequency when lateral excitations are provided to the tank due to rigid body and/or structural accelerations. It will be appreciated that the location of this sloshing propellant varies as fuel is expended. Accordingly, the slosh zone may encompass the entire containment area or any portion of the containment area where it is desired to attenuate sloshing.

The low profile slosh attenuation system allows for slosh attenuation to a desired level in the slosh zone. For example, in one implementation as will be described in detail below, the low profile slosh attenuation system provides a slosh damping of at least 0.5% for slosh angles of 5 degrees, as specified by launch vehicle design requirements. The low profile slosh attenuation system includes a number of slosh barriers and has a low lateral profile such that, for a given wall portion of the propellant tank extending across a longitudinal distance of at least one foot within the slosh zone, the low profile slosh attenuation system is substantially wholly contained within a space extending laterally no more than about three inches and; preferably, no more than about an inch from the outwardmost section of the wall portion. Thus, in the case of an approximately 12 foot diameter tank where the barriers extend circumferentially around the tank to form an annulus, the slosh attenuation system may be contained within areas occupying less than about 4% of the tank diameter and, more preferably, less than about 1.4%. Preferably, the low profile system extends across a wall portion having a longitudinal length of at least 4 feet, such that any supplemental baffling is minimized (although there may be further supplemental baffling effects due to splice rings or other structure). In one embodiment, the low profile slosh attenuation system extends longitudinally across the entire slosh zone without the need for any slosh baffling extending past the low profile space.

According to another aspect of the present invention, a slosh attenuation system is integrated into a structural grid. It has been verified that significant slosh attenuation can be achieved using slosh barriers of minimal lateral extent that are closely spaced along a longitudinal extent of the slosh zone. In particular, such barriers can be less than three inches deep, and even less than one inch deep for a liquid propellant tank having a width of approximately 12 feet. These dimensions allow the slosh attenuation system to be integrated with certain conventional structural grids such as isogrids. Such structural grids have been utilized to provide structural strength and rigidity in lightweight spacecraft structures. In accordance with the present invention, such grids can be used to reduce or eliminate the need for conventional ring baffles extending inwardly into the tank behind the structural grid. Preferably, the structural grid is of a type and is oriented such that the grid defines ribs extending along a path contained in a lateral plane, i.e., a plane substantially perpendicular to the longitudinal axis of the tank, for example, the ribs may extend circumferentially about the tank to define annular barriers. However, it is noted that even barriers oriented along a path having a lateral component (e.g., angled relative to a lateral plane and/or non-linear) contribute to slosh attenuation. The present invention also encompasses a corresponding method for attenuating slosh using a low profile system such as a structural grid.

The present invention thus reduces or eliminates the need for conventional, high profile slosh baffle rings in a liquid propellant tank of a launch vehicle. Accordingly, the mass, structural complexity and cost of the tank can be reduced. As a result, the thrust requirements for a particular mission can be reduced and/or the payload capability can be enhanced, all while providing a desired level of slosh attenuation.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION

In the following description, the invention is set forth in the context of a slosh attenuation system integrated into an isogrid structure of liquid propellant tanks for a particular type of launch vehicle. Such integration of the slosh attenuation system into a structural grid is particularly advantageous as it reduces or eliminates baffle structure dedicated exclusively to slosh attenuation, thereby reducing mass, structure complexity and cost. However, it will be appreciated that a low profile slosh attenuation system may be constructed in accordance with the present invention apart from such an isogrid structure. Moreover, the specific launch vehicle type propellant types and other details set forth below are provided for purposes of illustration, and it will be appreciated that the invention is not limited to any such specifics.

Figure 1:
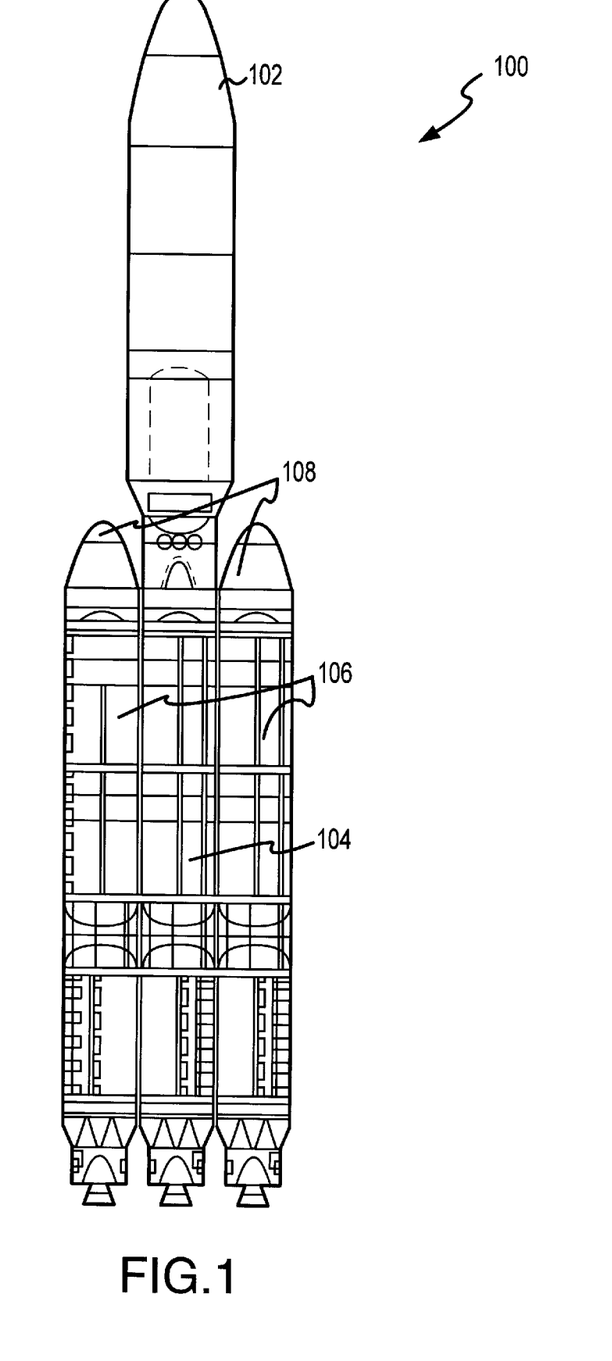
FIG. 1 is a side view of a launch vehicle in connection with which the present invention may be employed.

Referring to FIG. 1, a launch vehicle 100, of a type in which the present invention may be implemented, is shown. Generally, the launch vehicle 100 is used to launch a payload fairing 102 carrying a payload from the earth's surface into orbit. The thrust necessary to launch the payload fairing into orbit is primarily provided by a number of rocket boosters including, in the illustrated embodiment, a core booster 104 and a number of strap-on boosters 106. In the illustrated embodiment, each of the strap-on boosters 106 includes a nose cone 108 for purposes of aerodynamics and shielding.

The present invention provides slosh attenuation for any of the launch vehicle propellant tanks including the fuel and/or oxidizer tanks of the common core booster 104 and/or strap-on boosters 106. Moreover, in the case of multi-stage booster systems, the present invention can be used in connection with any or all of the stages.

Figure 2:
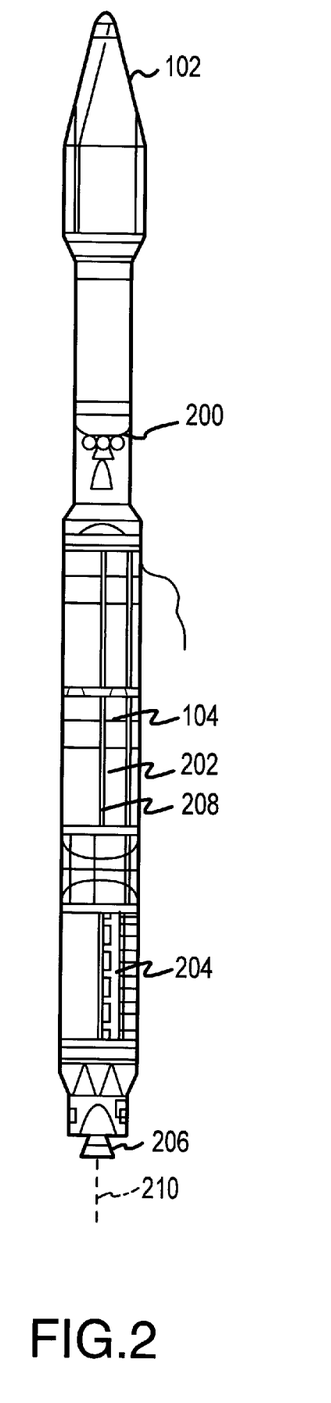
FIG. 2 is a side view showing the common core booster and payload fairing of the launch vehicle of FIG. 1.

FIG. 2 is a side view of a portion of the launch vehicle 100 of FIG. 1 including the payload fairing 102 and the common core booster 104. As shown in FIG. 2, the payload fairing 102 is associated with a second stage rocket engine 200 that may be activated after the common core booster 104 and strap-on boosters 106 (FIG. 1) are separated from the launch vehicle 100. The present invention may also be used in connection with such a second stage rocket engine in cases where liquid fuels are used for the second stage.

As shown in FIG. 2, the common core booster includes an oxidizer tank 202 and a rocket fuel tank 204. Each of these tanks carries liquid propellants and includes the slosh attenuation system of the present invention. In this regard, the oxidizer tank 202 may contain $LO_2$ and the fuel tank 204 may include, for example, $RP_1$. The common core booster 104 generates thrust by contacting the fuel and oxidizer to provide combustion and then expelling the combustion product at high speeds from the nozzle 206. In this regard, the oxidizer is transported to the combustion area by a propellant line 208.

As noted above, the launch vehicle 100 may be subject to jostling as it flies through the atmosphere due to any of various influences such as wind and maneuvering. As a result of such jostling, the propellants in the tanks 202 and 204 will tend to slosh. Due to the substantial mass of the propellants, such sloshing can have a significant impact on structural loading and guidance. In the case of the launch vehicle 100 of FIGS. 1 and 2, the fraction of the total weight of the propellants that will slosh at liftoff may be 24,725 pounds for the $LO_2$ and 17,425 pounds for the $RP_1$. Accordingly, attenuating such slosh is a significant concern.

Figure 3:
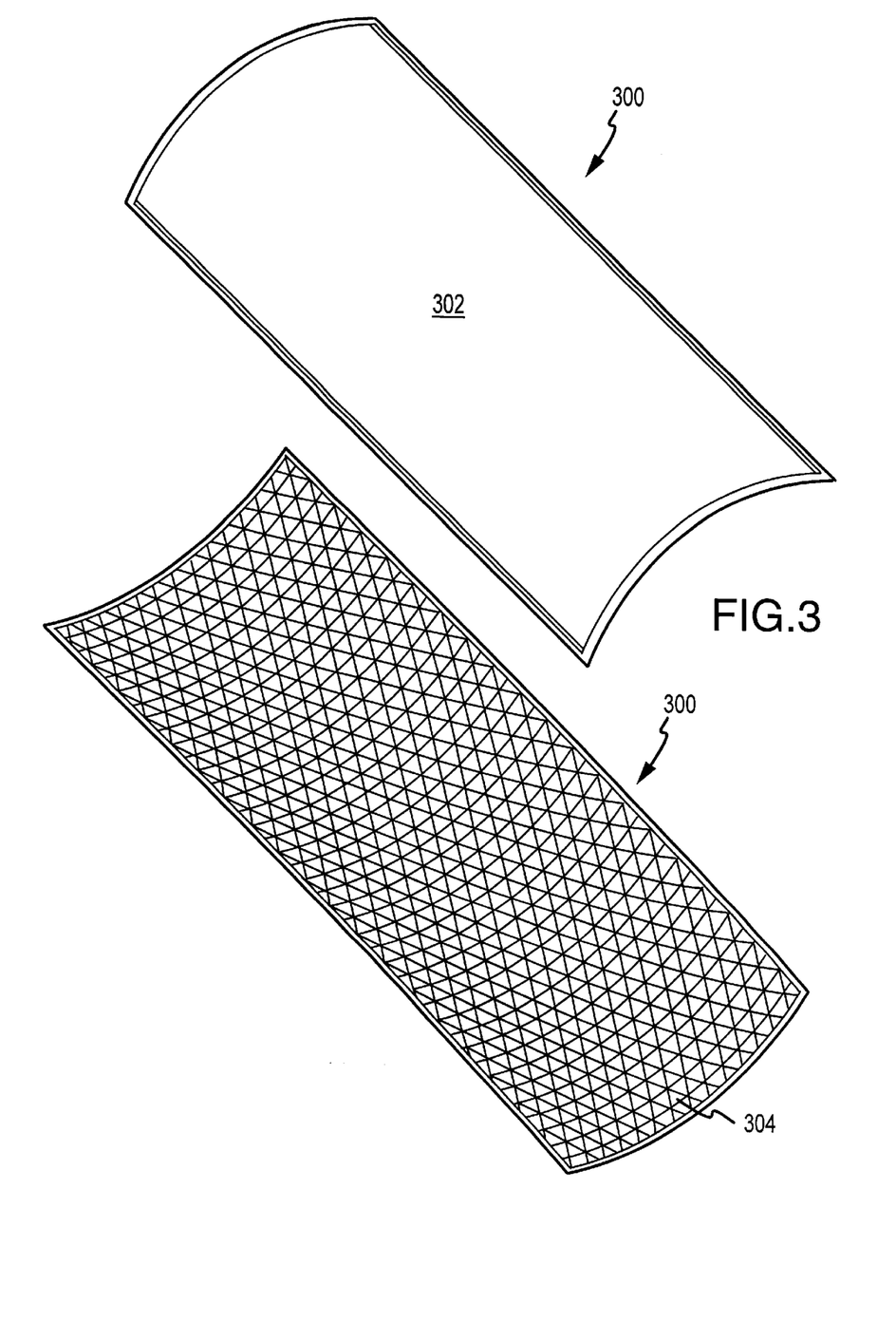
FIG. 3 is a perspective view showing the inside and outside configurations of isogrid panels which can be used in implementing the present invention.

The present invention is based in part on the recognition that a desired level of slosh attenuation can be attained by using low profile slosh barriers. In a particularly advantageous application of the present invention, the slosh barriers can actually be incorporated into suitable isogrid panels. FIG. 3 illustrates one such type of isogrid panel that can be used in connection with the propellant tanks for slosh attenuation. The illustrated isogrid panels 300 have an outer surface 300 that is generally smooth. However, the inner surface 304 of the panel 300 includes a number of ribs defining a grid pattern. These panels 300 have conventionally been produced to provide a desirable combination of structural qualities. In particular, the panels are light weight as is desired for launch vehicle/spacecraft applications and also provide substantial load bearing strength and stiffness.

Figures 4A, 4B, 4C:
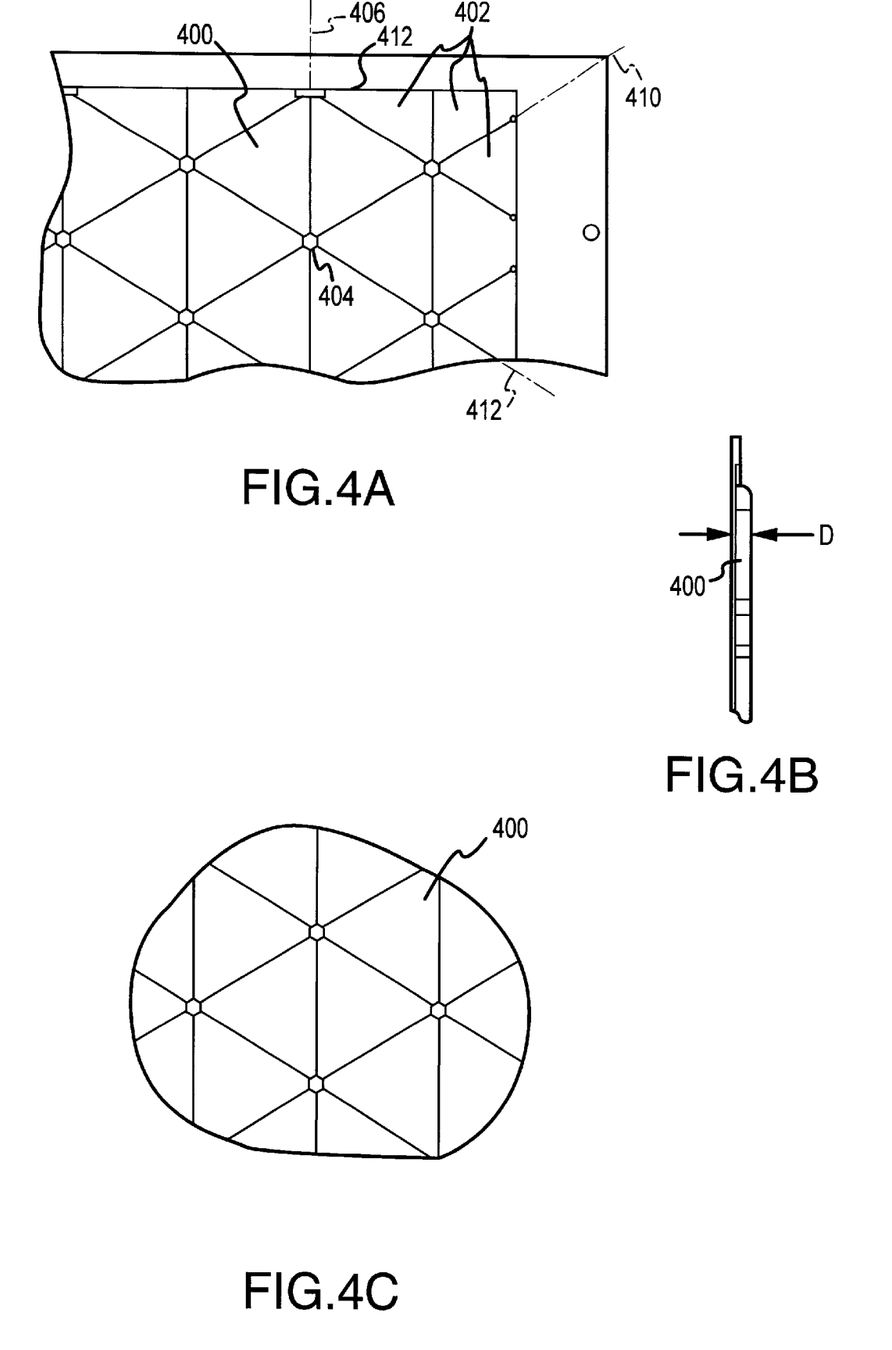
FIG. 4A is a side view of a portion of an isogrid panel showing the cell configuration.
FIG. 4B is an end view of the panel portion of FIG. 4A showing the depthwise dimensions.
FIG. 4C is a cutout side view of the panel portion of FIG. 4A showing the panel cell geometry.

FIGS. 4A–4C show details of the grid configuration. As shown in FIG. 4A, the ribs define a number of cells including generally triangular cells 400 and irregular cells 402. The irregular cells 402 occur, for example, at the outer edges of a panel. Importantly for purposes of the present invention, it will be noted that the ribs define straight longitudinal barriers extending across multiple cells. In particular, certain junctions such as junction 404 shown in FIG. 4A, are defined by the intersection of three such straight barriers. Accordingly, the grid structure includes three axes of symmetry relative to the junction 404. These axes are generally identified by the reference numerals 406, 408 and 410 in FIG. 4A. It will be noted that axis of 406 is perpendicular to a side edge 412 of the panel. Conveniently, the slosh attenuation system of the present invention can be implemented by constructing the propellant tanks with the isogrid panels oriented such that the side edges of 406 of the panels are generally aligned with the longitudinal axis (see axis 210 of FIG. 2) of a propellant tank. In this orientation, the ribs of the isogrid panel will define a number of slosh barriers aligned with axis 406, where each such slosh barrier is generally contained within a plane perpendicular to the longitudinal axis 210 of the propellant tank. However, it is to be expressly understood that other grid patterns and orientations may be employed in accordance with the present invention. It will be appreciated that the illustrated barriers extend across multiple panels to define a generally annular ring around the propellant tank. Such a configuration and orientation is believed to provide for a substantial degree of slosh attenuation.

Referring to FIG. 4B, an end view of a portion of the isogrid panel is shown. It will be appreciated that the depth of the individual cells of the isogrid can vary from application to application. Common isogrid designs have a cell depth that is less than about one inch. In the illustrated embodiment, cell 400 has a depth D of approximately 0.810 inches.

FIG. 4C shows the individual cell geometry. As shown, the regular cells 400 of the panel generally have an equilateral triangle configuration where each edge of the cell has a length of about 8.146 inches although this varies somewhat from grid to grid. It will therefore be appreciated that adjacent sides of the cell 400 subtend an angle of 60 degrees. Accordingly, the distance between successive slosh barriers that are in planes perpendicular to the longitudinal axis of the tank is about 7.054 inches. It will also be noted that the other ribs are oriented at an angle of 60 degrees relative to such slosh barrier rings. These ribs will also contribute to slosh attenuation, although to a lesser degree due to their angled orientation.

In the illustrated embodiment, the slosh attention system of the present invention is thus integrated into the structural isogrid panels that are used to form the propellant tanks. As will be discussed below, this design has been found to provide a desired level of slosh attenuation, for example, in the case of the illustrated launch vehicle 100, the slosh attenuation system met the launch vehicle design requirements by providing slosh damping of at least 0.5 percent for a slosh angle of 5 degrees. This verification process is described in the example below.

EXAMPLE

Figure 5A:
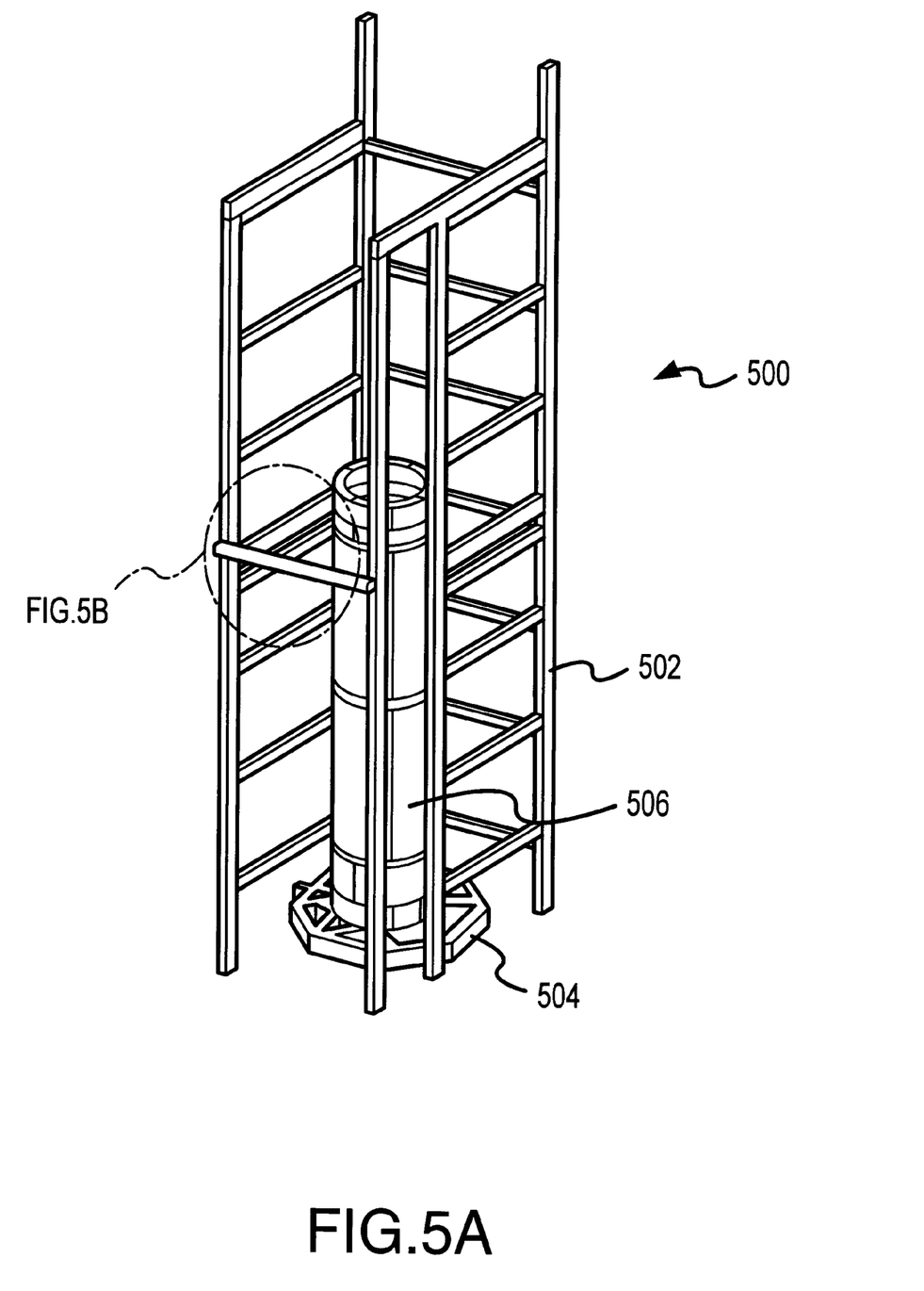
FIG. 5A is a perspective view showing a test setup used to verify the slosh attenuation characteristics of the present invention.
Figure 5B:
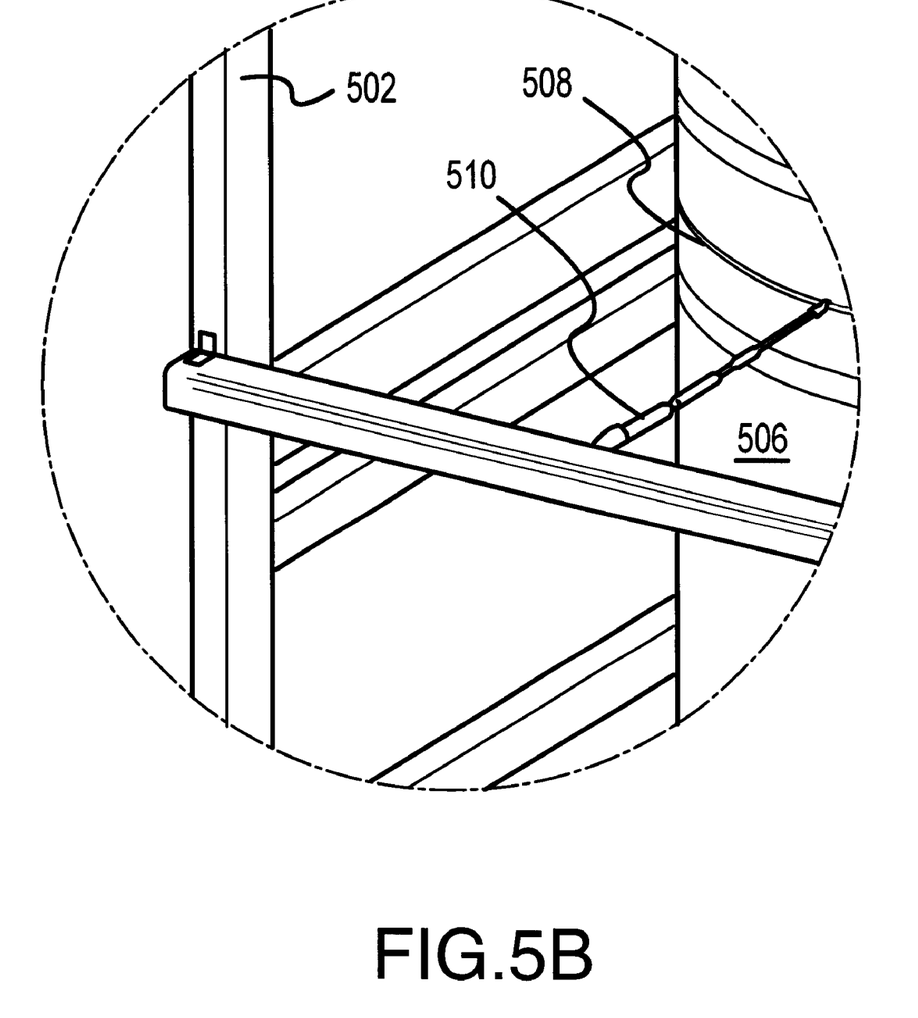
FIG. 5B is a perspective blowup showing certain detail of the test setup of FIG. 5A.
Figure 5C:
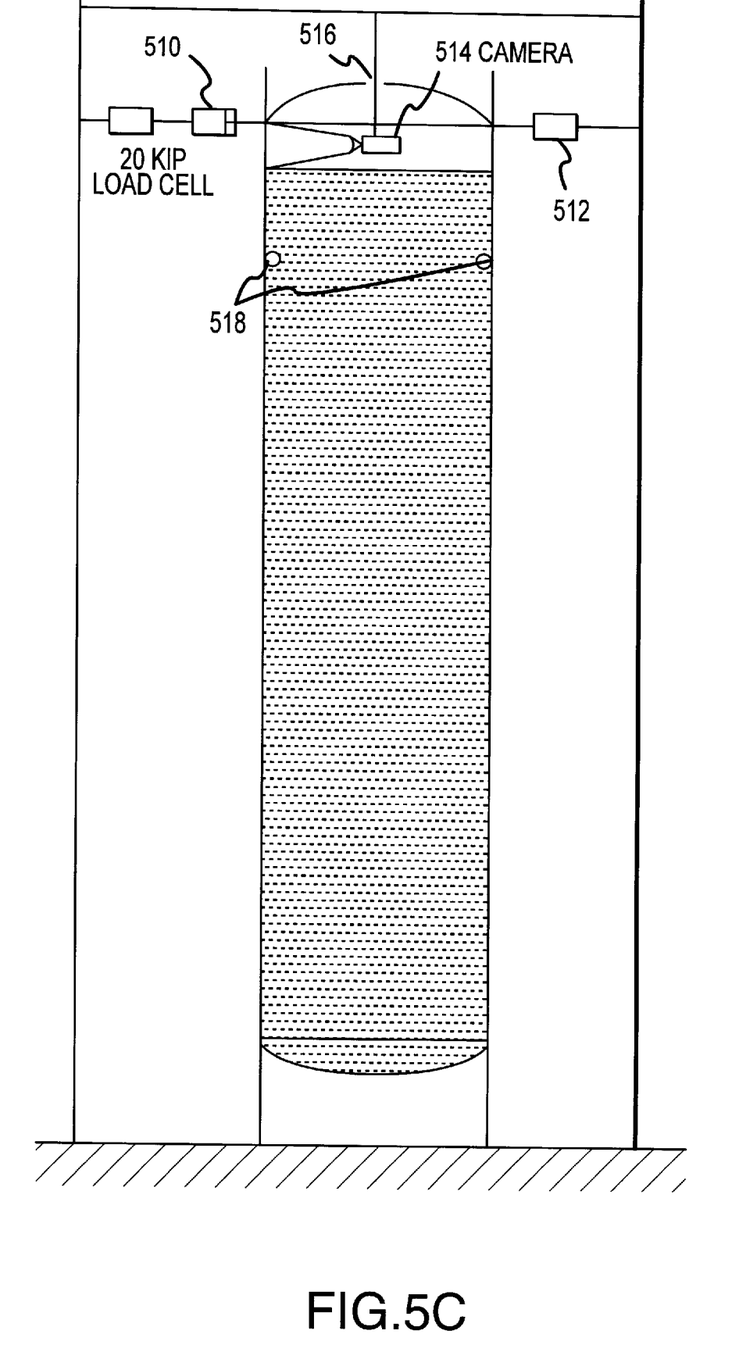
FIG. 5C is a side diagram illustrating certain features of the test setup of FIG. 5A.

In order to verify the slosh attenuation performance of propellant tanks constructed as described above, a full scale test facility was established as shown in FIGS. 5A–5C. This test facility as well as the specific tests performed and results obtained are described in detail in United States Provisional Patent Application No. 60/081,082 entitled "Fuel Tank and Method of Attenuating Slosh and Fuel Tanks" which is incorporated herein by reference in its entirety. As illustrated, the facility 500 generally includes a test stand 502, a lower skirt 504 which interfaces with a full scale $LO_2$ 506 and an upper skirt 508 to which shear loads were applied to induce sloshing within the booster structure. The tanks 506 was filled with water for testing purposes. The damping characteristics of water are similar to and generally fall somewhere between the damping characteristics of $LO_2$ and $RP_1$. The isogrid structure used to construct the tank 506 had a configuration, and were oriented, as described above. The specific isogrids employed during the test had an isogrid cell depth of 0.910 inches and an isogrid spacing of 5.124 inches.

The LO₂ tank used for testing was 12.5 feet in diameter with a cylindrical barrel section 576 inches tall. Each end of the barrel section was closed with a dome 53 inches tall. Also part of the tank 506 was a 36 inch upper adaptor skirt and an 81 inch lower tank skirt. At each end of the tank 506, an additional 40 inch skirt (i.e., skirts 504 and 508) was built to attach the tank to the cantilever base and to support the upper load head making the total test article almost 64 feet tall.

The tank 506 was filled with water treed with a NALCO corrosion inhibitor to within four feet of the interface between the barrel section and the upper dome tangency point. The test was conducted without any tank pressurization with the upper "manhole" cover removed to allow for visual observation of the fluid sloshing from a bridge which was built across the test stand 502.

The hydraulic actuator 510 for the slosh test was a MOOG series 73 servo valve driven device with a 5 square inch effective piston area in the retraction direction and a 7.5 square inch piston area in extension. The round end of the actuator had a sleeve covering the rod which mechanically limited the total stroke of the actuator to approximately 6 inches. The actuator 510 was driven with a variable pressure hydraulic supply which was set to 3000 psi for the slosh test which limited the potential force that the actuator developed to slightly over 20,000 pounds. An external string pot 512 was employed to provide a feedback signal used to monitor the actual stroke.

In order to monitor the actual propellant sloshing dynamics, a video camera 514 was utilized which could be lowered into the tank through the manhole cover 516 in the top of the tank 506. The camera 514 was positionable to monitor the motion of the slosh wave along the plane of excitation from a vantage point of 1 to 1.5 feet above the undisturbed water surface. A bank of lights was used so that the slosh wave could be clearly observed in the tank. The isogrid panel provided a built in slosh wave measurement device since the circumferential rings created by the isogrid were spaced 5.124 inches apart and can act as a ruler to infer slosh wave height. Pressure transducers 518 were installed adjacent to the inner tank wall in order to obtain slosh related measurements. The test setup further included a series of linear variable displacement transducers (LVDTs) and string potentiometers (not shown) located as 6 different axial locations and at various clock angles around the tank. The top three locations were potentiometers and the bottom three locations were LVDTs. The pressure transducers 518 were placed down below the water surface and were used to monitor the oscillatory pressure head created as the slosh wave climbs up and down the tank side walls. The pressure sensed by the transducers 518 was used to provide a measurement of the slosh wave height above the undisturbed surface at the radial location of the sensor. These sensors were mounted four to five inches away from the tank walls to avoid boundary layer/local surface roughness effects.

The damping tests were undertaken in two phases. The first phase isolated the true slosh mode frequency so that subsequent runs can be driven at the resonant frequency so as to maximize slosh wave magnitude for a given driving amplitude. The second phase involved driving the tank at a series of increasing command amplitudes so that the non-linear damping behavior as a function of the slosh wave height could be evaluated The tests were repeated in order to increase confidence in the test data. The command amplitudes that were tested were sinusoidal excitations at the slosh mode resonant frequency at zero to peak amplitudes of 0.25, 0.5, 0,75 and 1.0 inches. The data monitored included (1) out of plane string pot data, (2) in plane string pot data, (3) load cell output data, (4) actuator stroke string pot data, (5) pressure transducer number 1 data, and (6) pressure transducer number 2 data. All data was displayed at an update rate of 25 Hz (0.04 seconds per sample). Based on the results of these tests, it was found that sufficient damping will be added by the isogrid pattern so that the booster slosh damping specification (slosh damping of at least 0.5 percent for a slosh angle of 5 degrees) was met without the need for slosh baffles in the LO₂ tank. This will allow for the removal of the slosh baffles which will reduce the dry weight of each booster of almost 400 pounds for the booster described above and will significantly simply the manufacture of the tanks resulting in substantial savings.

While various embodiments and implementations of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A liquid propellant tank for a launch vehicle, said launch vehicle being adapted for flight through atmosphere where said launch vehicle is subjected to lateral forces having a component lateral to a flight path of said launch vehicle, wherein said lateral forces induce sloshing of a liquid propellant in said liquid propellant tank, said sloshing having a potentially significant impact on launch vehicle loading and control; said liquid propellant tank comprising:

a containment area for containing said liquid propellant, said containment area having a longitudinal axis and a width, extending transverse to said longitudinal axis, wherein in operation, said propellant tank is generally oriented such that said longitudinal axis is aligned with said flight path and said lateral forces tend to induce a slosh defined by a non-uniform distribution of said liquid propellant relative to said width of said containment area, said distribution varying over time, said containment area further including a longitudinal slosh zone defined relative to the range of locations of a surface of said liquid propellant as said liquid propellant is expended during a launch operation; and a low profile slosh attenuation system for attenuating said slosh, said low profile slosh attenuation system having a low lateral profile such that, for a given wall portion of said tank extending across a longitudinal distance of a least one foot within said slosh zone, said low profile slosh attenuation system is substantially wholly contained within a space extending laterally no more than about three inches from a laterally outermost section of said given wall portion, said low profile slosh attenuation system including a plurality of slosh barriers extending from said given wall portion, said low profile slosh attenuation system being structurally integrated with said wall portion of said tank, wherein said low profile slosh attenuation system allows for slosh attenuation to a defined level, avoids undue ring baffle mass and allows for simplified and reduced cost liquid propellant tank construction.

2. A liquid propellant tank as set forth in claim 1, wherein said space within which said low provide slosh attenuation system is contained for said given wall portion, extends laterally no more than about one inch from said laterally outwardmost section of said given wall portion.

3. A liquid propellant tank as set forth in claim 1, wherein said low profile slosh attenuating system is an integrally formed part of said given wall portion.

4. A liquid propellant tank as set forth in claim 1 wherein said low profile slosh attenuation system is incorporated into an isogrid structure.

5. A liquid propellant tank as set forth in claim 1, wherein each of said slosh barriers comprises an elongate rib extending in a direction averse to said longitudinal axis.

6. A liquid propellant tank as set forth in claim 1, wherein said plurality of slosh barriers comprises a first plurality of ribs and a second plurality of ribs, said first plurality of ribs intersecting said second plurality of ribs to form a grid of cells.

7. A liquid propellant tank as set forth in claim 1, wherein said longitudinal distance of said wall portion is at least about four feet and said low profile slosh attenuation system is substantially wholly contained within said space throughout said longitudinal distance.

8. A liquid propellant tank as set forth in claim 1, wherein said low profile slosh attenuation system is incorporated into an isogrid structure and said liquid propellant tank si substantially free from slosh baffle rings separate from said isogrid structure.

9. A liquid propellant tank as set forth in claim 1, wherein said low profile slosh attenuation system provides slosh damping of at least 0.5% for slosh angles of 5°.

10. A propellant tank comprising:
   means for defining an internal containment area for containing fluid said containment area including a slosh zone portion extending a longitudinal distance of at least about four feet; and
   attenuation means, interconnected to an inner wall of said means for defining, for impeding at a surface of said fluid a non-uniform fluid flow along at least a longitudinal extent of said inner wall, said attenuation means being integrated into a structural grid of said inner wall such that said attenuation means is free from baffle structure extending inwardly from said inner wall beyond said structural grid within said slosh zone portion.

11. A liquid propellant tank as set forth in claim 10, wherein said structural grid comprises a homogeneous structure having a plurality of immediately adjacent cells, wherein the fluid within a first of said plurality of immediately adjacent cells is free to directly flow to a second of said plurality of immediately adjacent cells when said first cell is substantially filled with fluid.

12. A liquid propellant tank as set forth in claim 10, wherein said structural grid includes a plurality of homogeneous cells, wherein each of said plurality of homogeneous cells has a first depth defined by a plurality of walls, wherein the fluid is free to flow from at least a first to a second of said plurality of homogeneous cells along said longitudinal extent of said inner wall when said first of said plurality of homogeneous cells is substantially filled with fluid.

13. A liquid propellant tank as set forth in claim 10, wherein said structural grid comprises a homogeneous structure having a plurality of immediately adjacent cells, wherein each of said plurality of cells has a first depth defined by at least three walls, wherein a first of said at least three walls of each of said plurality of cells defines a plurality of substantially continuous, longitudinally displaced annular rings along said longitudinal extent of said inner wall.

14. A liquid propellant tank as set forth in claim 13, wherein said first depth is constant along said longitudinal extent.

15. A liquid propellant tank as set forth in claim 10, wherein said structural grid comprises a plurality of homogeneous cells integrally formed with said inner wall.

16. A method for impeding a non-uniform fluid flow of a fluid comprising steps of:
   (a) defining a substantially cylindrical internal containment area having an inner wall and a structural grid interconnected to and structurally integrated with said inner wall wherein said structural grid extends inwardly from said inner wall a first distance;
   (b) containing the fluid within a first longitudinal extent of said cylindrical internal containment area, wherein a surface of said fluid is at a first level corresponding to said first longitudinal extent;
   (c) reducing said fluid within said cylindrical internal containment area from said first level to at least a second level, said second level being separated from said first level by a distance of at least four feet; and
   (d) restricting, during at least said reducing step, the non-uniform fluid flow of said surface of said fluid along at least a portion of said first longitudinal extent of said inner wall of said cylindrical internal containment area using said structural grid such that the non-uniform fluid flow of said surface between said first and second levels is restricted to a desired degree free from any baffle structure extending inwardly from said inner wall beyond said structural grid.

17. A liquid propellant tank as set forth in claim 16, wherein said structural grid comprises a homogeneous structure having a plurality of cells, said restricting step comprising the step of allowing said fluid to flow from a first into a second of said plurality of cells when said first of said plurality of cells is substantially filled with said fluid.

18. A liquid propellant tank as set forth in claim 16, wherein said nonuniform fluid flow of said surface of said fluid has a slosh angle of at least about 5°, wherein said restricting step comprises the step of damping, during at least said reducing step, at least about 0.5% of said non-uniform fluid flow of said surface of said fluid having a slosh angle of at least about 5°.

19. A liquid propellant tank as set forth in claim 16, wherein said cylindrical internal containment area is included in a launch vehicle, wherein at least said portion of said first longitudinal extent of said inner wall of said cylindrical internal containment area is located longitudinally above a center of gravity of said launch vehicle.

20. A liquid propellant tank as set forth in claim 16, wherein said cylindrical internal continent area defines a propellant tank and said fluid comprises liquid oxygen.

* * * * *

UNITED STATES PATENT AND TRADEMARK OFFICE
CERTIFICATE OF CORRECTION

PATENT NO. : 6,283,412 B1 Page 1 of 1
DATED : September 4, 2001
INVENTOR(S) : Mango It is certified that error appears in the above-identified patent and that said Letters Patent is hereby corrected as shown below:

Column 9,
Line 6, delete the word "averse" and insert therefor -- transverse --;

Column 10,
Line 55, delete the word "continent" and insert therefor -- containment --.

Signed and Sealed this

Twenty-sixth Day of February, 2002

*Attest:*

JAMES E. ROGAN
*Attesting Officer*     *Director of the United States Patent and Trademark Office*